United States Patent
Chu et al.

(10) Patent No.: US 9,243,741 B1
(45) Date of Patent: Jan. 26, 2016

(54) TELESCOPING MONOPOD APPARATUS FOR HOLDING PHOTOGRAPHIC INSTRUMENT

(71) Applicant: Kevin Hwading Chu, Houston, TX (US)

(72) Inventors: Kevin Hwading Chu, Houston, TX (US); Xiran Wang, West Lafayette, IN (US); Yangyang Chen, Houston, TX (US)

(73) Assignee: Intellectual Fortress, LLC, Houston, TX (US)

( * ) Notice: Subject to any disclaimer, the term of this patent is extended or adjusted under 35 U.S.C. 154(b) by 0 days.

(21) Appl. No.: 14/690,717

(22) Filed: Apr. 20, 2015

(51) Int. Cl.
*F16M 13/00* (2006.01)
*H04N 5/225* (2006.01)
*H04N 5/232* (2006.01)

(52) U.S. Cl.
CPC ............. *F16M 13/00* (2013.01); *H04N 5/2251* (2013.01); *H04N 5/23219* (2013.01)

(58) Field of Classification Search
CPC ... F16M 13/00; H04N 5/2251; H04N 5/2259; H04N 5/23219; G03B 17/563; G03B 17/566; G03B 17/568
See application file for complete search history.

(56) References Cited

U.S. PATENT DOCUMENTS

| | | | | |
|---|---|---|---|---|
| 4,530,580 | A * | 7/1985 | Ueda | F16M 13/04 248/187.1 |
| 6,220,556 | B1 * | 4/2001 | Sohrt | F16C 11/106 248/278.1 |
| 6,384,863 | B1 * | 5/2002 | Bronson | H04N 5/2251 348/208.99 |
| 6,769,824 | B2 * | 8/2004 | Nakatani | F16M 11/00 396/419 |
| D511,352 | S * | 11/2005 | Oliver | D16/203 |
| 7,199,832 | B2 * | 4/2007 | Oran | H04N 5/2251 348/373 |
| 7,217,044 | B1 * | 5/2007 | Marks, Jr. | F16M 11/06 348/376 |
| 7,540,459 | B2 * | 6/2009 | Asano | B60R 11/0241 248/309.1 |
| 7,706,673 | B1 * | 4/2010 | Staudinger | F16M 11/06 348/211.2 |
| 8,002,480 | B2 * | 8/2011 | Polster | G03B 17/38 396/425 |
| 2002/0141812 | A1 * | 10/2002 | Edelen | F16B 7/14 403/109.1 |
| 2004/0118985 | A1 * | 6/2004 | Omps | F16C 11/0619 248/181.1 |
| 2005/0092878 | A1 * | 5/2005 | Murray | F16M 11/04 248/171 |
| 2006/0257137 | A1 * | 11/2006 | Fromm | F16M 11/18 396/420 |
| 2008/0117328 | A1 * | 5/2008 | Daoud | F16M 11/10 348/373 |
| 2009/0003822 | A1 * | 1/2009 | Tyner | F16M 11/32 396/428 |
| 2009/0136290 | A1 * | 5/2009 | Persson | B60R 11/0252 403/125 |
| 2010/0200710 | A1 * | 8/2010 | Shenouda | F16M 13/00 248/157 |

(Continued)

FOREIGN PATENT DOCUMENTS

GB WO 9501531 A1 * 1/1995 ........... F16M 11/041

*Primary Examiner* — Roberto Velez
*Assistant Examiner* — Tuan Le

(57) ABSTRACT

A telescoping monopod apparatus that is configured to hold a photographic instrument. The telescoping monopod apparatus includes a body that houses a control component and an electronic component. The body has a rotatable bottom end. The telescoping monopod apparatus includes a plurality of shafts disposed in an interior of the body. The upper end is opposite of the rotatable bottom end. The telescoping monopod apparatus includes a ball disposed on an uppermost shaft of the plurality of shafts. The telescoping monopod apparatus includes a spheroidal joint that is configured to receive the ball on a first end. The spheroidal joint is attached to a holder on a second end.

17 Claims, 12 Drawing Sheets

(56) References Cited

U.S. PATENT DOCUMENTS

| | | | |
|---|---|---|---|
| 2013/0176412 A1* | 7/2013 | Chen | H04N 7/183 348/77 |
| 2013/0250130 A1* | 9/2013 | Roshanravan | G03B 17/56 348/207.1 |
| 2014/0209777 A1* | 7/2014 | Klemin | F16M 13/04 248/544 |
| 2014/0313358 A1* | 10/2014 | Yu | H04N 5/23222 348/211.7 |
| 2015/0077630 A1* | 3/2015 | Miller | H04N 5/2251 348/376 |

* cited by examiner

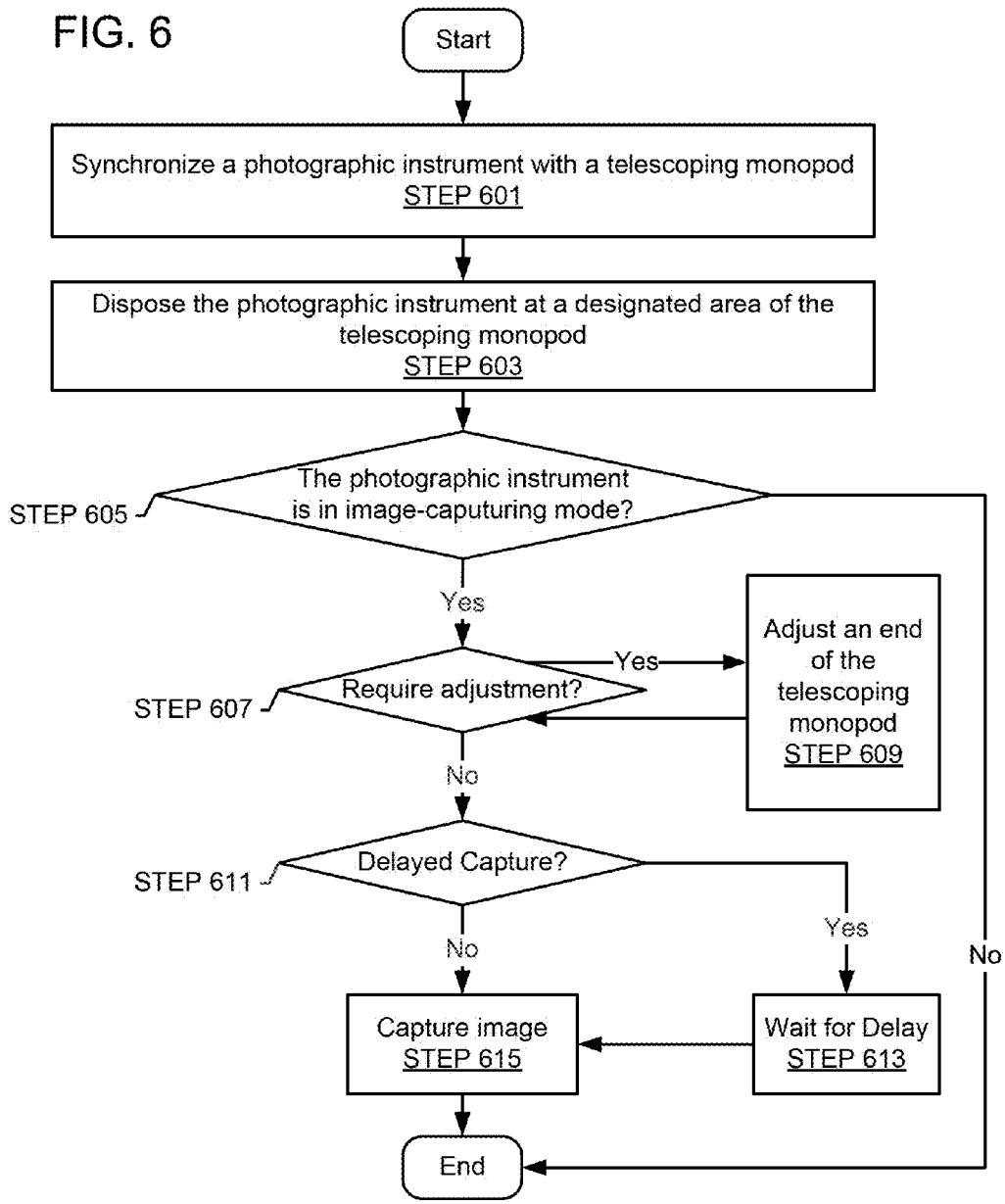

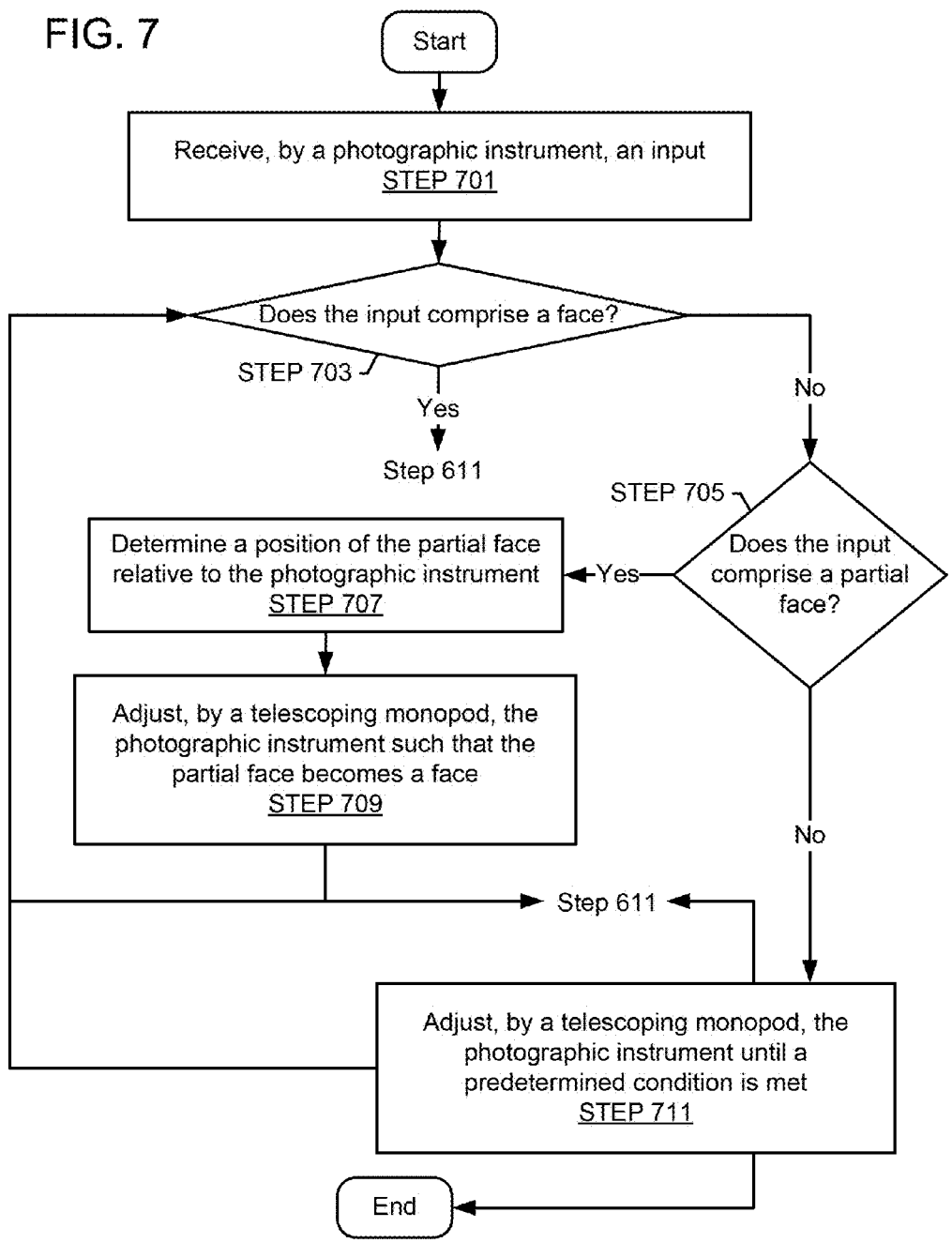

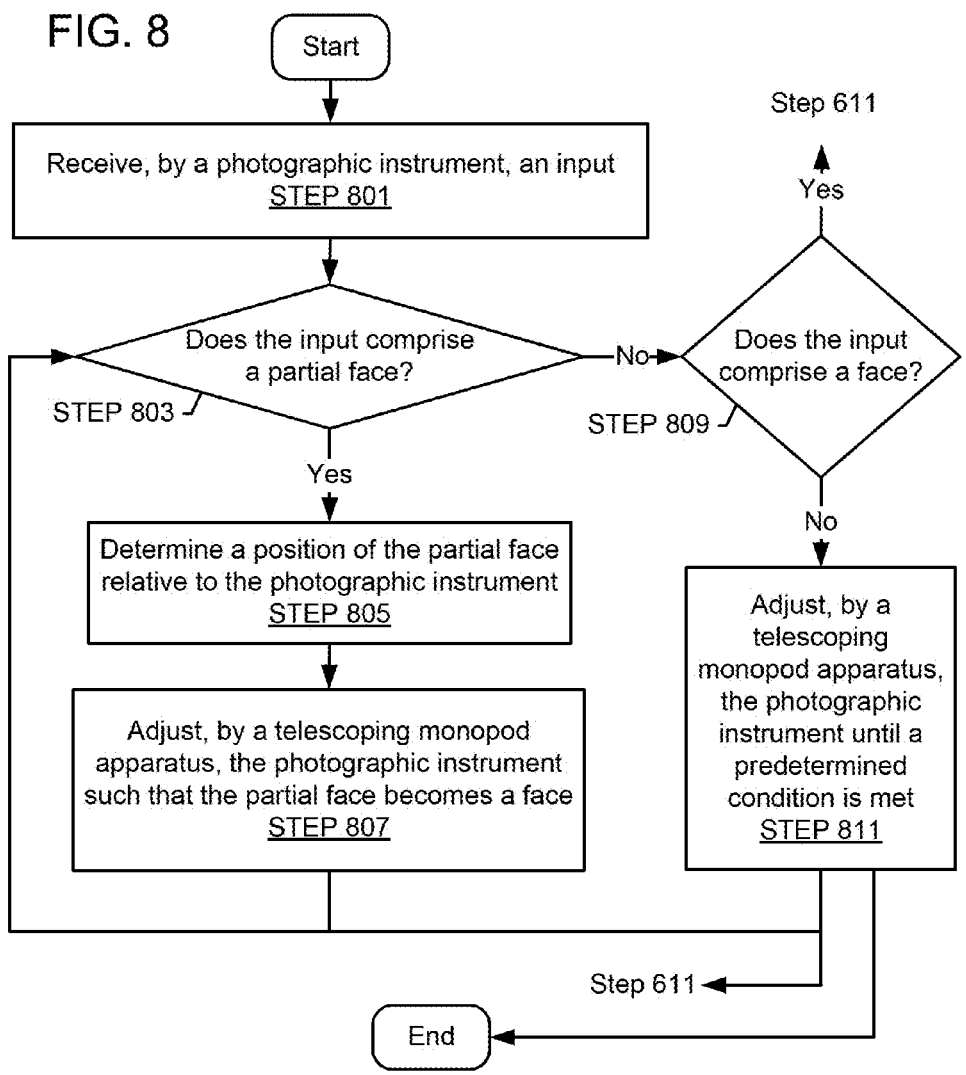

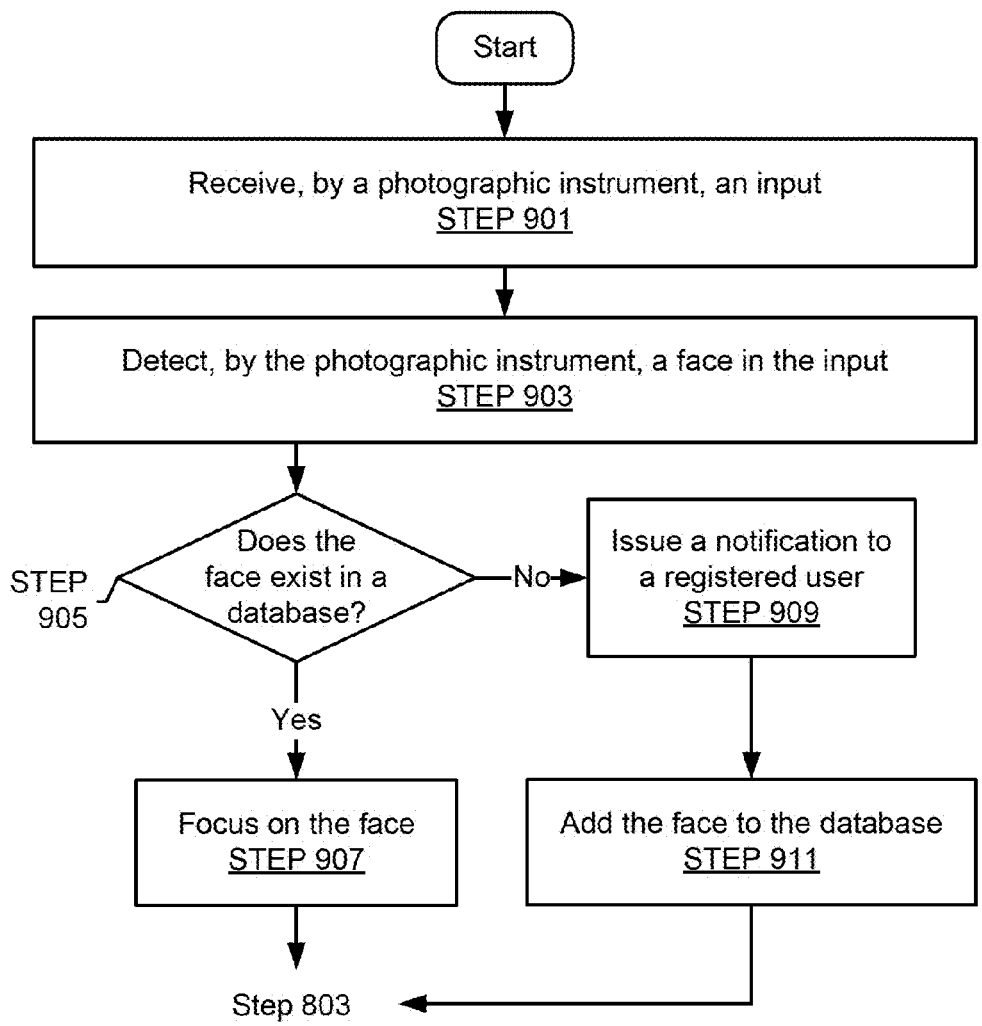

US 9,243,741 B1

TELESCOPING MONOPOD APPARATUS FOR HOLDING PHOTOGRAPHIC INSTRUMENT

BACKGROUND

A telescoping monopod apparatus enables a user to capture selfie photographs by positioning a photographic instrument, e.g., smartphone, camera, etc., beyond a normal range of an arm of the user. The photographic instrument may be secured to a designated area at a first end of the telescoping monopod apparatus; a control panel of the telescoping monopod apparatus may control an operation of the telescoping monopod apparatus and the photographic instrument. The photographic instrument may be secured to a holder disposed at a second end of the telescoping monopod apparatus. The telescoping monopod apparatus generally requires the user to manually adjust a distance between the first end and the user to enable the user to capture a target image. Adjustment of the telescoping monopod apparatus may be necessary when the user decides that the target image requires adjustment. Frequent manual adjustment of the telescoping monopod apparatus may cause strain and deformity to the telescoping monopod.

SUMMARY

In general, in one aspect, one or more embodiments disclosed herein relate to a telescoping monopod apparatus configured to hold a photographic instrument comprising: a body housing a control component and an electronic component, the body having a rotatable bottom end attached thereto; a plurality of shafts disposed in an interior of the body from an upper end of the body, the upper end is opposite of the rotatable bottom end; a ball disposed on an uppermost shaft of the plurality of shafts; and a spheroidal joint configured to receive the ball on a first end, the spheroidal joint is attached to a holder on a second end.

In another aspect, one or more embodiments disclosed herein relate to a method for using a telescoping monopod apparatus to capture an image comprising: synchronizing a photographic instrument with the telescoping monopod apparatus, the telescoping monopod having a first end and a second end; disposing the photographic instrument in a holder of the telescoping monopod apparatus, the holder is attached to the first end; determining that the photographic instrument is in an image-capturing mode; extracting, by the image-capturing mode, a humanoid feature; detecting that the humanoid feature comprises a cutoff; adjusting a distance between the first end and the second end; and capturing an adjusted image.

In yet another aspect, one or more embodiments disclosed herein relate to a method for using a telescoping monopod apparatus to capture an image comprising: synchronizing a photographic instrument with the telescoping monopod apparatus; disposing the photographic instrument in a holder of the telescoping monopod apparatus; determining that the photographic instrument is in an image-capturing mode; streaming, by the photographic instrument, an input; determining, by the photographic instrument or the telescoping monopod apparatus, whether the input comprises a partial face; if the determining determines that the input comprises the partial face, adjusting, by the telescoping monopod apparatus, the photographic instrument so that the partial face becomes a face; and capturing, by the photographic instrument, an image of the face.

Other aspects and advantages of the disclosure will be apparent from the following description and the appended claims.

BRIEF DESCRIPTION OF DRAWINGS

FIG. 6 shows a method for using a telescoping monopod apparatus in conjunction with a photographic instrument to capture an image according to one or more embodiments.

FIG. 7 shows a method for face detection and recognition and for adjusting a telescoping monopod apparatus in Euclidean space according to the face detection and recognition according to one or more embodiments.

FIG. 8 shows a method for face detection and recognition and for adjusting a telescoping monopod apparatus in Euclidean space according to the face detection and recognition according to one or more embodiments.

FIG. 9 shows a method for focusing a photographic instrument according to one or more embodiments.

DETAILED DESCRIPTION

Figures 1A, 1B:
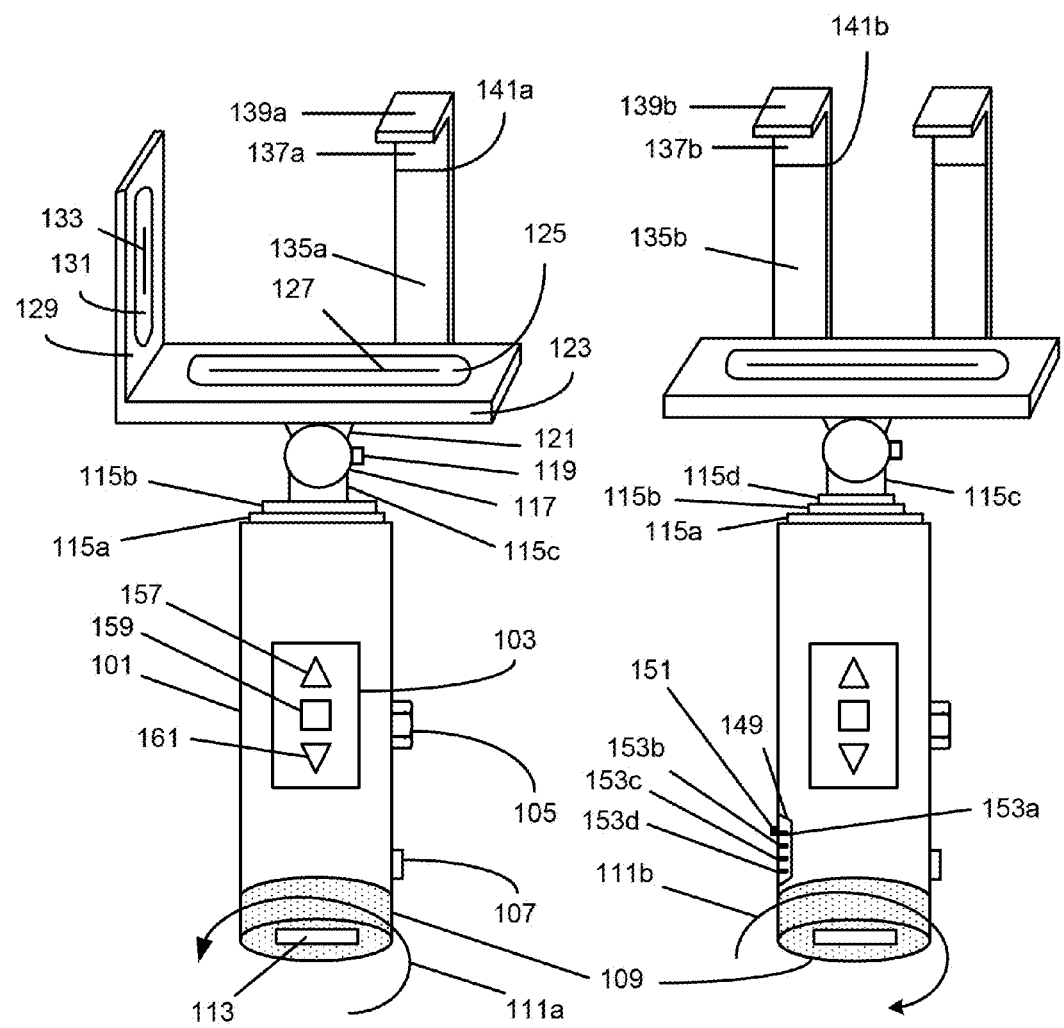
FIG. 1A shows a telescoping monopod apparatus according to one or more embodiments.
FIG. 1B shows a telescoping monopod apparatus according to one or more embodiments.

Specific embodiments will now be described in detail with reference to the accompanying figures. Like elements in the various figures are denoted by like reference numerals for consistency. Like elements may not be labelled in all figures for the sake of simplicity.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create a particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure relate to a telescoping monopod apparatus configured to hold a photographic instrument. In general, embodiments of the disclosure relate to a method for using a telescoping monopod apparatus to capture an image.

FIG. 1A shows a telescoping monopod apparatus according to one or more embodiments. The telescoping monopod apparatus may be between 20 cm and 100 cm in length. The weight of the telescoping monopod apparatus may vary from one embodiment to another, depending on the composition of the material of the various components. The body (101) may be made with aluminum, or any other durable material that can withstand water and rust. Components other than the body (101) may be made with aluminum, plastic, or any other durable material that can withstand water and rust. FIG. 1A also shows a holder comprising a spheroidal joint (121), a base (123) having a pad (125) having a groove (127), a side wall (129) having a pad (131) having a groove (133), a holding claw (135a), a moveable portion (137a), a retainer (139a), and a spring (141a).

As shown in FIG. 1A, the telescoping monopod apparatus has multiple components including a body (101), a control panel (103), an adjustment knob (105), a power switch (107), a rotatable bottom end (109), a crevasse (113), a plurality of shafts (a first shaft (115a), a second shaft (115b), and a third shaft (115c)), a ball (117), a position fixing knob (119), a spheroidal joint (121), a base (123) having a pad (125) having a groove (127), a side wall (129) having a pad (131) having a groove (133), a holding claw (135a), a moveable portion (137a), a retainer (139a), and a spring (141a). As also shown in FIG. 1A, various components of the telescoping monopod apparatus may be connected directly or indirectly with one another. Each of these components, along with their functions and interactions with other components, is described below.

In one or more embodiments, the body (101) may house an electronic component and a control component. In one or more embodiments, the body (101) may comprise the control panel (103), the adjustment knob (105), the power switch (107), and the rotatable bottom end (109). The plurality of shafts (the first shaft (115a), the second shaft (115b), and the third shaft (115c)) may be disposed in an interior of the body (101) from an upper end of the body (101), the upper end may be an opposite end of the rotatable bottom end (109). The body (101) may be between 10 cm and 20 cm.

Although the body (101) has been described to comprise certain components, the disclosure is not limited thereto. For example, in one or more embodiments, the body (101) may further comprise a grip, a handle, a cap, etc., so that the telescoping monopod apparatus may be used as a staff. In one or more embodiments, the grip, the handle, the cap, etc., may be capped around the rotatable bottom end (109) so that the crevasse (113) is sealed and protected from water, dust, etc. This may be advantageous for mountaineers and users participating in certain sports that would otherwise require a separate staff. For example, in one or more embodiments, the body (101) may be wrapped with any material (e.g., silicone compositions) that may help improve grip.

In one or more embodiments, the control panel (103) may comprise an up arrow button (157), a square adjust-and-capture button (159), and a down arrow button (161). The control panel (103) and the body (101) may be monolithic. In one or more embodiments, the control panel (103) may comprise an additional housing. The control panel (103) is explained in more details in reference to FIGS. 2-4C.

In one or more embodiments, the adjustment knob (105) may be operatively connected to the body (101). The adjustment knob (105) may be a gear piece, a toggle, a flip, or any other component that may be configured to be in a plurality of states. The adjustment knob may be made from aluminum, or from any other durable material that can withstand water and rust.

In one or more embodiments, the adjustment knob (105) may be a part of the control component and/or the electrical component. The adjustment knob (105) may be turned in a counterclockwise direction (111a) or may be turned in a clockwise direction (111b) relative to an axis of the adjustment knob (105).

In one or more embodiments, when turned in the clockwise direction (111b), the adjustment knob (105) may increase a distance between the rotatable bottom end (109) and an upper end of the third shaft (115c) as the clockwise motion may actuate the control component housed by the body (101).

In one or more embodiments, when turned in the counterclockwise direction (111a), the adjustment knob (105) may decrease the distance between the rotatable bottom end (109) and the upper end of the third shaft (115c) as the counterclockwise motion may actuate the control component housed by the body (101).

In one or more embodiments, the power switch (107) may be operatively connected to the body (101). The power switch (107) may be a part of the control component and/or the electrical component. The power switch (107) may be configured to turn the telescoping monopod apparatus to an on-state or to an off-state.

Although FIG. 1 shows the power switch (107) to be a button, the present disclosure is not limited thereto. For example, the power switch (107) may be embedded in the body (101). For example, the power switch (107) may be a motion sensor. For example, the power switch (107) may be a conductive plate having a conductive film.

In one or more embodiments, the rotatable bottom end (109) may be operatively connected to the body (101). The rotatable bottom end (109) may be a part of the control component and/or the electrical component. The rotatable bottom end (109) may be turned in a clockwise direction (111b) relative to a center axis of the body (101) or may be turned in a counterclockwise direction (111a) relative to the center axis of the body (101).

In one or more embodiments, when turned in the clockwise direction (111b), the rotatable bottom end (109) may increase a distance between the rotatable bottom end (109) and an upper end of the third shaft (115c) as the clockwise motion may actuate the control component housed by the body (101).

In one or more embodiments, when turned in the counterclockwise direction (111a), the rotatable bottom end (109) may decrease a distance between the rotatable bottom end (109) and the upper end of the third shaft (115c) as the counterclockwise motion may actuate the control component housed by the body (101).

In one or more embodiments, when turned in the clockwise direction (111b), the holder may roll/rotate in the clockwise direction (111b).

In one or more embodiments, when turned in the counterclockwise direction (111a), the holder may roll/rotate in the counterclockwise direction (111a).

In one or more embodiments, the rotatable bottom end (109) may be made of a translucent or a transparent material. In one or more embodiments, a light source (e.g., a light-emitting diode) may be disposed in the rotatable bottom end (109) so that a user of the telescoping monopod apparatus may use the rotatable bottom end (109) as a flashlight.

In one or more embodiments, the rotatable bottom end (109) may comprise the crevasse (113) configured to receive an insert of an electronic device. In one or more embodiments, the rotatable bottom end (109) may be configured to receive, via the crevasse (113), a universal serial bus (USB). In one or more embodiments, the rotatable bottom (109) may be configured to receive a grip, a handle, a cap, etc., to seal the crevasse (113) from water, dust, etc.

In one or more embodiments, the plurality of shafts (the first shaft (115a), the second shaft (115b), and the third shaft (115c)) may be disposed in an interior of the body (101) from an upper end of the body (101). In one or more embodiments, each of the plurality of shafts may or may not have the same length as another shaft. In one or more embodiments, the plurality of shafts may be between 20 cm and 80 cm. In one or more embodiments, the plurality of shafts may be concentric to one another and/or may be concentric to the body (101). In one or more embodiments, the plurality of shafts may be fixed to one another concentrically by sharing an indented track. In one or more embodiments, the plurality of shafts may be made from aluminum, or from any other durable material that can withstand water and rust.

In one or more embodiments, when tuning the rotatable bottom end (109) in the clockwise direction (111b), the plurality of shafts (the first shaft (115a), the second shaft (115b), and the third shaft (115c)) may also rotate the holder in the clockwise direction (111b). In one or more embodiments, the body (101) may rotate in the clockwise direction (111b) when the plurality of shafts (the first shaft (115a), the second shaft (115b), and the third shaft (115c)) rotate in the clockwise direction (111b)).

In one or more embodiments, when turning the rotatable bottom end (109) in the counterclockwise direction (111a), the plurality of shafts (the first shaft (115a), the second shaft (115b), and the third shaft (115c)) may also rotate the holder in the counterclockwise direction (111b). In one or more embodiments, the body (101) may also rotate in the counterclockwise direction (111a) when the plurality of shafts (the first shaft (115a), the second shaft (115b), and the third shaft (115c)) rotate in the clockwise direction (111b)).

In one or more embodiments, the ball (117) having a first end and a second end may be operatively connected to the upper end of the third shaft (115c) using the first end. In one or more embodiments, the ball (117) may be operatively connected to the spheroidal joint (121) using the second end. In one or more embodiments, the ball (117) may have protrusions spread equidistant from one another across the ball (117) to provide traction between the ball (117) and the spheroidal joint (121). In one or more embodiments, the spheroidal joint (121) may subject the ball (117) to two degrees of freedom. In one or more embodiments, the spheroidal joint (121) may subject the ball (117) to a spherical coverage. That is, the ball (117) may move in any direction with respect to the spheroidal joint (121). In one or more embodiments, the spheroidal joint (121) may subject the ball (117) to three degrees of freedom (i.e., pan, tilt, and roll). In one or more embodiments, degrees of freedom greater than three may be possible with the use of at least two balls and/or other actuating components. In one or more embodiments, the ball (117) may contact the actuator of the control component and be subject to rotation in a horizontal plane and/or rotational in a vertical plane. That is, the ball (117) may be utilized such that the holder may be panned and tilted. In one or more embodiments, the holder connected to the ball (117) may have a pan range of +/−170 degrees and a tilt range of +/−90 degrees. In one or more embodiments, the holder connected to the ball (117) may have a pan range of +/−180 degrees and a tilt range of +/−180 degrees. In one or more embodiments, the holder connected to the ball (117) may roll. The ranges are determined by the physical limits of the various cables and actuators of the control component. One of ordinary skill in the art would recognize that the terms "pan," "tilt", and "roll" may be substituted by other equivalent terms. That is, one of ordinary skill in the art would be able to describe the orientation of the holder and the ball using Euler angles, other coordinate systems, and/or any markers that describe a Euclidean space.

In one or more embodiments, the position fixing knob (119) may be operatively connected to the ball (117) and may fix a position of the ball, and hence configured to fix the position of the holder (if a holder is attached to the ball (117)), relative to the body (101). In one or more embodiments, the position fixing knob (119) may be configured to a fix a position of the ball relative to the spheroidal joint (121). In one or more embodiments, the position fixing knob may be absent or not utilized if the ball (117) is allowed to rotate, thereby enabling the holder to pan and tilt relative to the body (101).

In one or more embodiments, the base (123) may have an upper face and a lower face. The upper face comprises the pad (125) having the groove (127). The base (123) may comprise the side wall (129) having the pad (131) having the groove (133). The base (123) may comprise the holding claw (137a).

In one or more embodiments, the pads (125, 131) may be made from a material that can secure the photographic instrument in the holder without causing scratches or damages to the photographic instrument. For example, the pads (125, 131) may be made from foam, rubber, silicone compositions, etc.

In one or more embodiments, the pads (125, 131) may comprise a groove (127, 133) configured to better secure the photographic instrument when the photographic instrument is disposed in the holder. The grooves (127, 133), the pads (125, 131), and the dimension and shape of the holder are not limited so long as the photographic instrument can be properly secured to the holder of the telescoping monopod apparatus. One of ordinary skill in the art would appreciate that because photographic instruments come in all sizes, shapes, and forms that the holder of the disclosed telescoping monopod apparatus may be modified as necessary to adequately secure the disposed photographic instrument. For example, a length of the base (123) may be modified depending on a height of the photographic instrument. For example, a length of the side wall (129) may be modified depending on a width of the photographic instrument. For example, a height of the holding claw (137a) and the retainer (139a) may be modified depending on a length of the photographic instrument. For example, two side walls may be utilized by the holder to hold the photographic instrument without the holding claw (137a), the moveable portion (139a), and the spring (141a).

In one or more embodiments, the holding claw (135a) may be disposed on a backside of the base (123). In one or more embodiments, the holding claw (135a) may comprise the moveable portion (137a), the retainer (139a), and the spring (141a). In the event that the length of the photographic instrument exceeds the height of the holding claw (135a) the moveable portion (137a) may extend in height to accommodate the additional length of the photographic instrument. The moveable portion (137a) may be extended by the spring (141a). The disclosure, however, is not limited thereto. For example, in the event that the length of the photographic instrument is less than the height of the holding claw (135a), the holding claw (135a) may be collapsed to accommodate the shorter length of the photographic instrument. The holding claw (135a) may be collapsed using any method. For example, the holding claw (135a) may comprise a plurality of portions wrapped concentrically to one another and change length using an indented track. In one or more embodiments, the holding claw (135a) may be adjustable (i.e., moveable in a direction parallel to the length of the holder). In one or more embodiments, the holding claw (135a) may be a flap, a clip, a pocket, etc. The flap, the clip, the pocket, etc., may be implemented in combination with any known fastener. For example, the pocket may be attached to the side wall (129) and may be configured to hold the photographic instrument by sealing the photographic instrument in the pocket using Velcro®.

FIG. 1B shows a telescoping monopod apparatus according to one or more embodiments. FIG. 1B shows a telescoping monopod apparatus that is substantially similar to the one shown in FIG. 1A. As discussed above, like elements in the various figures are denoted by like reference numerals for consistency. Like elements may not be labelled in all figures for the sake of simplicity. Further, explanations of components that have already been described will be omitted for the sake of brevity.

FIG. 1B shows a plurality of shafts (the first shaft (115a), the second shaft (115b), the third shaft (115c), and the fourth shaft (115d)). The plurality of shafts is disposed in an interior of the body (101) from an upper end of the body (101), the upper end is an opposite end of a rotatable bottom end (109). One of ordinary skill in the art would appreciate that the number of shafts of the plurality of shafts may vary depending on manufacturing factors and consumer demands.

In one or more embodiments, the body (101) may comprise a timer (149) having a toggle (151). The toggle (151) of the timer (149) may be configured to interlock with one of a plurality of gaps (first gap (153a), second gap (153b), third gap (153c), and fourth gap (153d)). Each of the plurality of the gaps (first gap (153a), second gap (153b), third gap (153c), and fourth gap (153d)) sets a predetermined delay time to the photographic instrument placed in the holder. For example, the first gap (153a) may subject whichever photographic instrument that is synchronized with the telescoping monopod apparatus to no time delay when capturing an image upon receiving a user input to capture the image. For example, the second gap (153b) may subject whichever photographic instrument that is synchronized with the telescoping monopod apparatus to a delay of one second when capturing an image upon receiving a user input to capture the image. For example, the third gap (153c) may subject whichever photographic instrument that is synchronized with the telescoping monopod apparatus to a delay of two seconds when capturing an image upon receiving a user input to capture the image. For example, the fourth gap (153d) may subject whichever photographic instrument that is synchronized with the telescoping monopod apparatus to a delay of three seconds when capturing an image upon receiving a user input to capture the image. The synchronizing of the telescoping monopod apparatus and the photographic instrument is described in more details in reference to FIG. 6.

In one or more embodiments, the holding claw (135a) may be disposed on a backside of the base (123). In one or more embodiments, the holding claw (135a) may comprise the moveable portion (137a), the retainer (139a), and the spring (141a). In the event that the length of the photographic instrument exceeds the height of the holding claw (135a) the moveable portion (137a) may extend in height to accommodate the additional length of the photographic instrument. The moveable portion (137a) may be extended by the spring (141a). The disclosure, however, is not limited thereto. For example, in the event that the length of the photographic instrument is less than the height of the holding claw (135a), the holding claw (135a) may be collapsed to accommodate the shorter length of the photographic instrument. The holding claw (135a) may be collapsed using any method. For example, the holding claw (135a) may comprise a plurality of portions wrapped concentrically to one another and change length using an indented track. In one or more embodiments, the holding claw (135a) may be adjustable (i.e., moveable in a direction parallel to the length of the holder). In one or more embodiments, the holding claw (135a) may be a flap, a clip, a pocket, etc. The flap, the clip, the pocket, etc., may be implemented in combination with any known fastener. For example, the pocket may be attached to the side wall (129) and may be configured to hold the photographic instrument by sealing the photographic instrument in the pocket using Velcro®.

In one or more embodiments, a plurality of holding claws (135a, 135b) may be disposed on the backside of the base (123). In one or more embodiments, each of the holding claws (135a, 135b) may comprise the moveable portion (137a, 137b), the retainer (139a, 139b), and the spring (141a, 141b). In the event that the length of the photographic instrument exceeds the height of the holding claws (135a, 135b) the moveable portions (137a, 137b) may extend in height to accommodate the additional length of the photographic instrument. The moveable portions (137a, 137b) may be extended by the spring (141a, 141b). The invention, however, is not limited thereto. For example, in the event that the length of the photographic instrument is less than the height of the holding claws (135a, 135b), the holding claws (135a, 135b) may be collapsed to accommodate the shorter length of the photographic instrument. The holding claws (135a, 135b) may be collapsed using any method. For example, the holding claws (135a, 135b) may each comprise a plurality of portions wrapped concentrically to one another and change length using an indented track. In one or more embodiments, the holding claws (135a, 135b) may be adjustable (i.e., moveable in a direction parallel to the length of the holder). In one or more embodiments, the holding claw (135a, 135b) may be a flap, a clip, a pocket, etc. The flap, the clip, the pocket, etc., may be implemented in combination with any known fastener. For example, the pocket may be attached to a side wall (129) and may be configured to hold the photographic instrument by sealing the photographic instrument in the pocket using Velcro®. In one or more embodiments, the plurality of holding claws (135a, 135b) may be positioned on the backside of the base (123) without the side wall (129). While FIG. 1B only illustrates the plurality of holding claws (135a, 135b) as having two claws, one of ordinary skill in the art would appreciate that any number of holding claws may be utilized. Further, the side wall (129) of FIG. 1A may also be replaced or used in combination with a holding claw. In one or more embodiments, the moveable portions (137a, 137b) may be extended in height by methods other than the springs (141a, 141b). For example, gears, belts, tracks, slides, protrusions, or any known actuating methods may be utilized in place of or in combination with the spring.

Figure 1C:
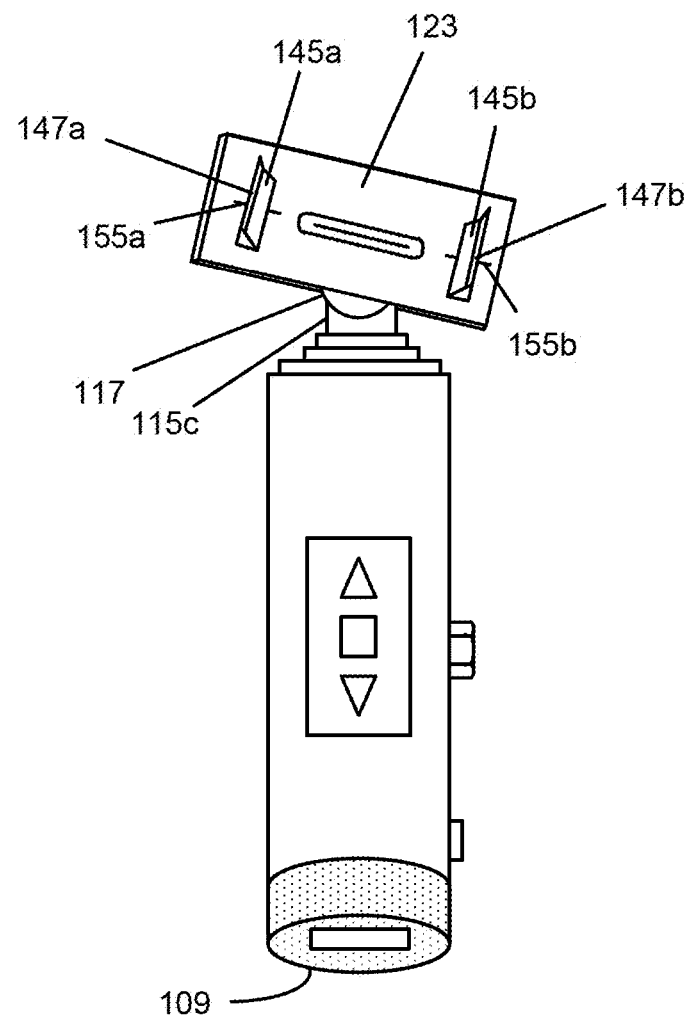
FIG. 1C shows a telescoping monopod apparatus according to one or more embodiments.

FIG. 1C shows a telescoping monopod apparatus according to one or more embodiments. FIG. 1C shows a telescoping monopod apparatus that is substantially similar to the one shown in FIG. 1A and the one shown in FIG. 1B. As discussed above, like elements in the various figures are denoted by like reference numerals for consistency. Like elements may not be labelled in all figures for the sake of simplicity. Further, explanations of components that have already been described will be omitted for the sake of brevity.

In one or more embodiments, a base (123) having an upper face and a lower face may be provided. The upper face of the base (123) may comprise the pad (125) having the groove (127). Two walls (145a, 145b) may be provided on the upper face to surround the pad (125) from two opposing directions. Each of the two walls (145a, 145b) may be restrained and configured to move by a spring (155a, 155b). The moving need not be performed by the spring (155a, 155b). One of ordinary skill in the art would appreciate that the moving may be accomplished by gears, combination of protrusions and indented tracks, etc. The two walls (145a, 145b) may clamp onto the photographic instrument the same way the holding claw (137a) does. In one or more embodiments, a retaining portion (147a, 147b) may be provided on each of the walls (145a, 145b) to provide more traction between the wall and the photographic instrument. In one or more embodiments, the retaining portion (147a, 147b) may be made from any material (e.g., foam, rubber, etc.) that can contact the photographic instrument without causing damage to the photographic instrument.

In one or more embodiments, the ball (117) may directly contact the lower face of the base (123) without the spheroidal joint (121). In one or more embodiments, a hole exists in the lower face of the base (123). The hole may serve, in place of the spheroidal joint (121), the function of retaining the ball.

In one or more embodiments, two pairs of the two walls (145a, 145b) may be provided to surround the pad (125). That is, four walls may be provided to surround the pad (125) and hold onto the photographic instrument. In one or more embodiments, one of the two pairs of the two walls (145a, 145b) may surround the pad (125) in a vertical direction. In one or more embodiments, the other of the two pairs of the two walls (145a, 145b) may surround the pad (125) in a horizontal direction. The four walls may each comprise its own movement mechanism, e.g., a spring. In one or more embodiments, a pair of the two walls may share an indented track coupled with a spring. In one or more embodiments, additional walls may be provided to secure the photographic instrument to the telescoping monopod apparatus.

FIG. 1C shows a telescoping monopod apparatus according to one or more embodiments. Explanations of components that have already been described will be omitted for the sake of brevity. FIG. 1C shows the ball (117) directly contacting the lower face of the base (123). In this example, the adjustment knob is absent so as to enable the combination of the ball (117) and the holder to pan, tilt, and roll. FIG. 1C shows the holder to be rolled, but not panned or tilted.

Figure 2:
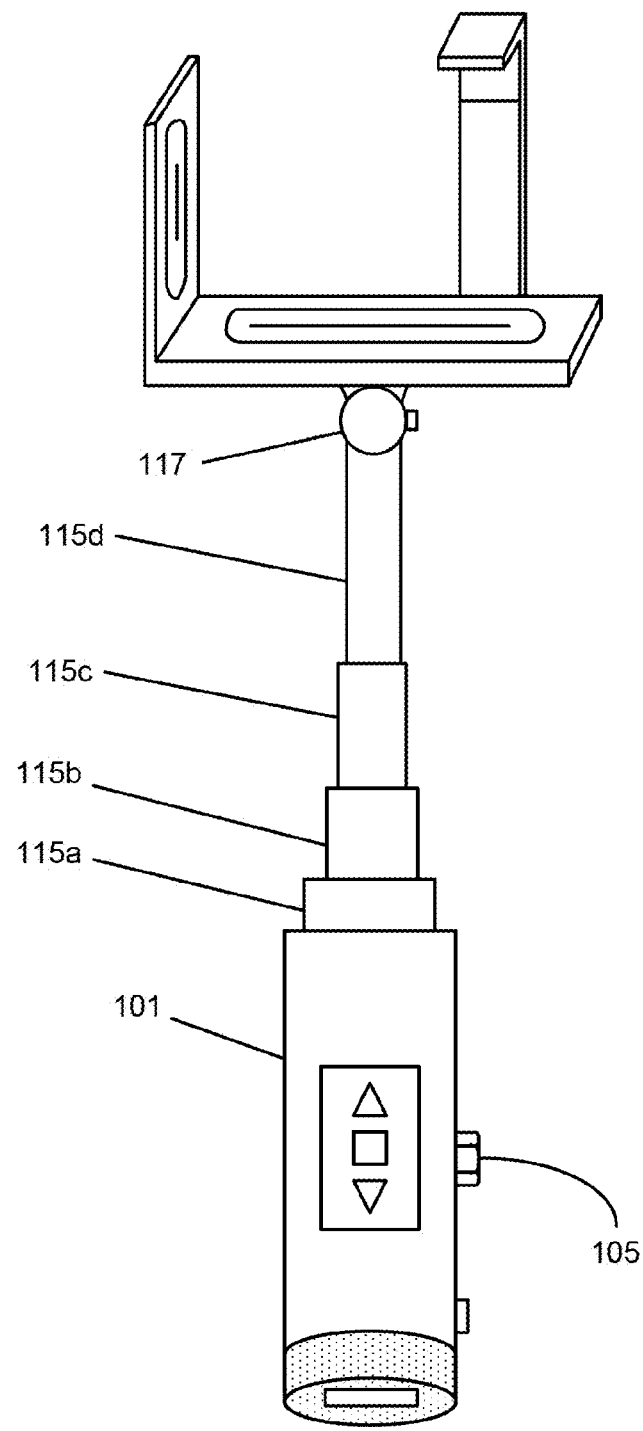
FIG. 2 shows a telescoping monopod apparatus according to one or more embodiments.

FIG. 2 shows a telescoping monopod apparatus according to one or more embodiments. Specifically, FIG. 2 shows a telescoping monopod apparatus when the plurality of shafts (the first shaft (115a), the second shaft (115b), the third shaft (115c), and the fourth shaft (115d)) extends from the body (101). In one or more embodiments, an uppermost shaft (115d) is extended to its fullest extent before the shaft (115c) immediately below the uppermost shafted is extended; the shaft (115c) is extended to its fullest extent before the shaft (115b) immediately below the shaft (115c) is extended, and so forth. In one or more embodiments, the plurality of shafts may simultaneously extend at the same rate as one another. In one or more embodiments, the plurality of shafts may simultaneously extend at a different rate.

In one or more embodiments, the control panel (103) may comprise an up arrow button (157), a square adjust-and-capture button (159), and a down arrow button (161). The control panel (103) and the body (101) may be monolithic. In one or more embodiments, the control panel (103) may comprise an additional housing.

In one or more embodiments, the up arrow button (157) may serve similar function as rotating the adjustment knob (105) in the clockwise direction (111b)(see above). That is, the up arrow button (157) may increase a distance between the rotatable bottom end (109) and an upper end of the fourth shaft (115d).

In one or more embodiments, the down arrow button (161) may serve similar function as rotating the adjustment knob (105) in the counterclockwise direction (111a)(see above). That is, the down arrow button (161) may decrease a distance between the rotatable bottom end (109) and an upper end of the fourth shaft (115d).

In one or more embodiments, the square adjust-and-capture button (159) may serve as a shutter for executing a command to capture an image by the synchronized photographic instrument. In one or more embodiments, the square adjust-and-capture button (159) may serve as an image focuser that works in conjunction with the photographic instrument, determines that a target image of the photographic instrument abides by a certain instruction (See FIG. 6), and then executes a command to capture an image by the synchronized photographic instrument.

In one or more embodiments, the shafts may be extended (increasing a distance between the rotatable bottom end (109) and an upper end of the shaft (115d)) or withdrawn (decreasing a distance between the rotatable bottom end (109) and an upper end of the shaft (115d)) using the adjustment knob (105).

In one or more embodiments, the shafts may be extended (increasing a distance between the rotatable bottom end (109) and an upper end of the shaft (115d)) or withdrawn (decreasing a distance between the rotatable bottom end (109) and an upper end of the shaft (115d)) using the rotatable bottom end (109).

Figure 3:
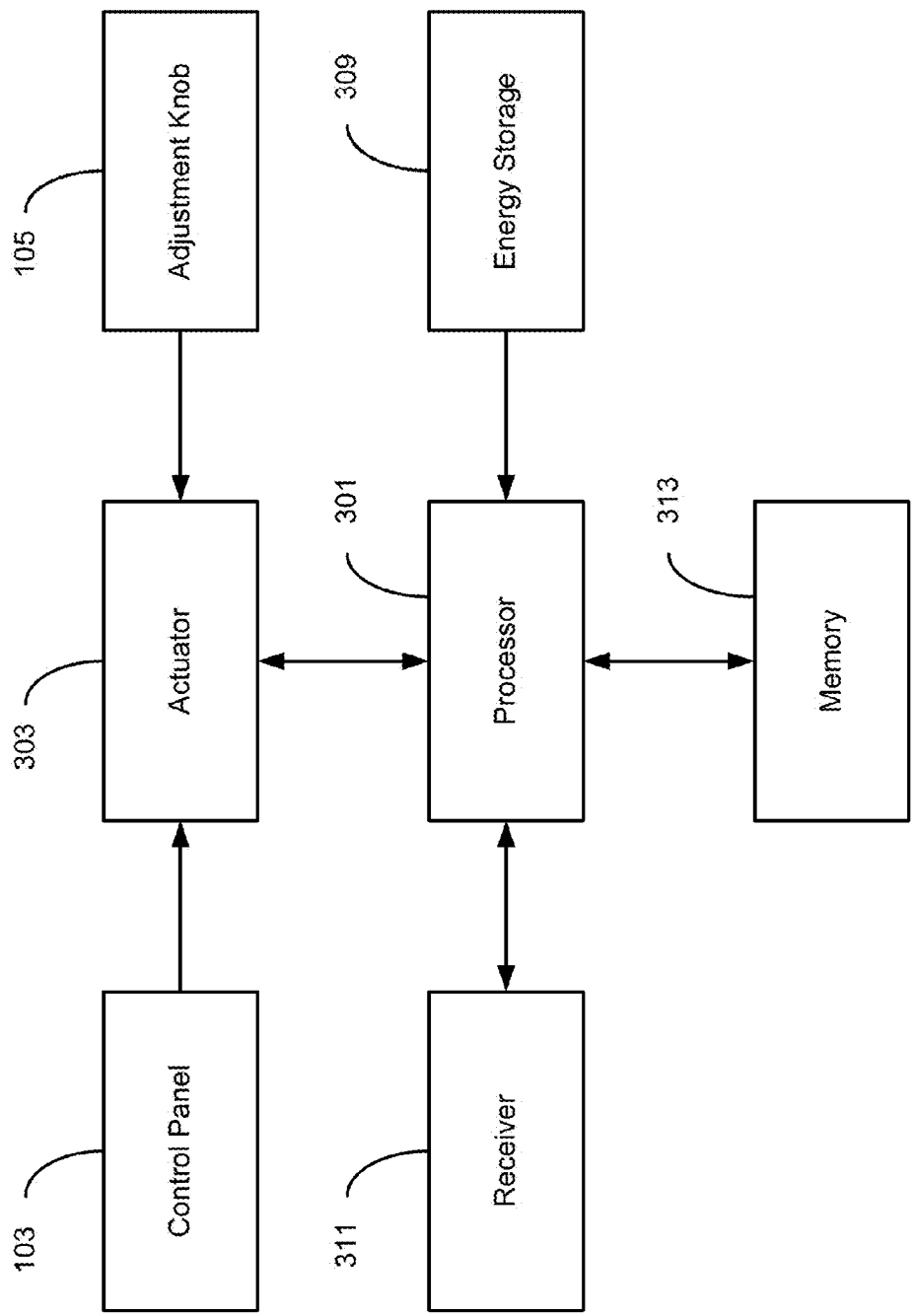
FIG. 3 shows a telescoping monopod apparatus system according to one or more embodiments.

FIG. 3 shows a telescoping monopod system according to one or more embodiments. Explanations of components that have already been described will be omitted for the sake of brevity. As shown in FIG. 3, the telescoping monopod apparatus system has both control component and electrical component. The multiple components may comprise a processor (301), an actuator (303), an energy storage (309), a receiver (311), a memory (313), a control panel (103), and an adjustment knob (105). As also shown in FIG. 3, the multiple components of the telescoping monopod apparatus system may interact, connect, and/or communicate with one another directly or indirectly. Each of these components, along with their functions and interactions with other components, is described below.

In one or more embodiments, the processor (301) may be a microprocessor or any multipurpose, programmable device that accepts a user input (which may be digital data) as input, processes the input according to instructions stored in the memory (313), and provides the results to actuator (303). In one or more embodiments, the processor (301) may be an integrated circuit for processing input. The results may cause the actuator (303) to move certain components of the telescoping monopod apparatus. The results may cause the actuator (303) to move certain components of the telescoping monopod apparatus at a certain speed, rate, direction, etc.

In one or more embodiments, the actuator (303) may be a gear system having a motor and a plurality of gears pinned to the plurality shafts. The gears attached to each of the plurality of shafts may be chained so as to enable motion translation from one shaft to another shaft. The gear arrangement is not limited so long as the shafts can be configured to move (extend or withdraw) in a direction parallel to the center axis of the body (101). The motor may be any common electric motor that is powered by direct current (DC) sources (e.g., batteries, etc.) or by alternating current (AC) sources.

In one or more embodiments, the actuator (303) may be a conveyor belt system. The conveyor belt system is described in more details in reference to FIGS. 4A-4C.

In one or more embodiments, the actuator (303) may be any system that enables motion translation from one shaft to another shaft. The actuator (303) is not limited so long as the shafts can be configured to move (extend or withdraw) in a direction parallel to the center axis of the body (101). In one or more embodiments, the actuator (303) may comprise mirrors and shafts (See FIGS. 5B and 5C). In one or more embodiments, the actuator (303) may comprise the ball (117).

In one or more embodiments, the energy storage (309) may be any storage that can store power to power the motor of the actuator (303). For example, the energy storage (309) may be a battery.

In one or more embodiments, the receiver (311) may be an antenna configured to transmit and receive wireless communication to and from an electronic device. When the receiver (311) receives transmission from the electronic device, the electronic device may be able to provide commands to the telescoping monopod apparatus system. That is, an electronic device separate from the telescoping monopod apparatus may be utilized to, for example, execute a command to capture an image by the photographic instrument that is synchronized with the telescoping apparatus. The electronic device may be, for example, a wireless shutter release remote control.

In one or more embodiments, the receiver (311) may be a plurality of antennas configured to receive and transmit wireless communication to and from an electronic device. When the receiver (311) wirelessly receives transmission from the electronic device, the electronic device may be able to provide commands to the telescoping monopod apparatus system. That is, an electronic device separate from the telescoping monopod apparatus may be utilized to, for example, execute a command to capture an image by the photographic instrument that is synchronized with the telescoping apparatus. The electronic device may be, for example, a wireless shutter release remote control. The electronic device may be, for example, the photographic instrument.

In one or more embodiments, the memory (313) stores instructions regarding certain actuation of the actuator (303). In one or more embodiments, the memory (313) may be, for example, random access memory (RAM), cache memory, flash memory, etc.

In one or more embodiments, the control panel (103) is operatively connected to the actuator (303) and the processor (301). The control panel (103) is described in more details in reference to FIGS. 1A and 2.

Figures 4A, 4B, 4C:
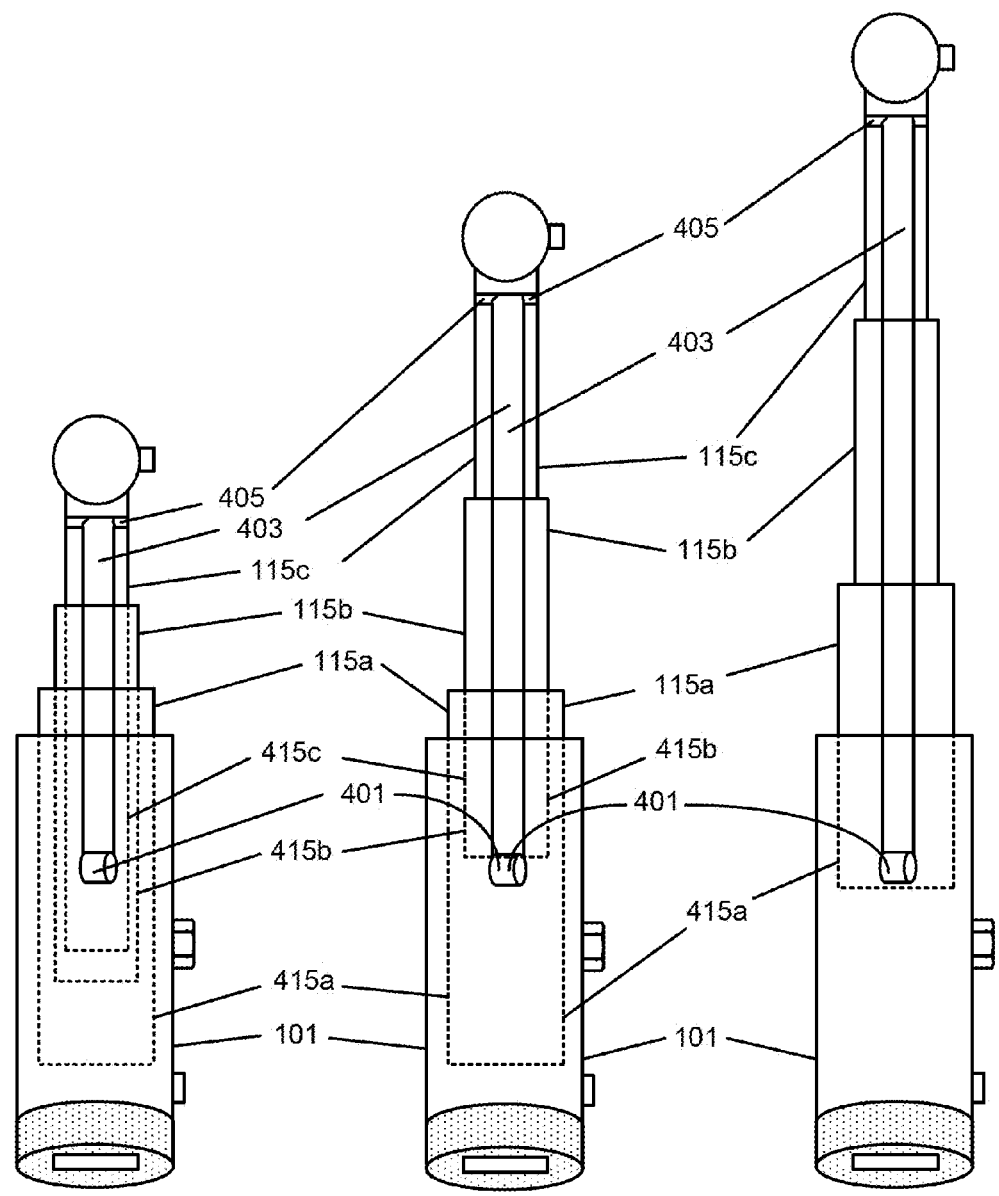
FIG. 4A shows a telescoping monopod apparatus according to one or more embodiments.
FIG. 4B shows a telescoping monopod apparatus according to one or more embodiments.
FIG. 4C shows a telescoping monopod apparatus according to one or more embodiments.

FIGS. 4A-4C show a telescoping monopod apparatus according to one or more embodiments. Explanations of components that have already been described will be omitted for the sake of brevity. FIGS. 4A-4C show a progression of the extension of the plurality of shafts (the first shaft (115a), the second shaft (115b), and the third shaft (115c)) by the actuator (303). However, as discussed, the disclosure is not limited thereto. That is, any moving mechanism may be utilized to actuate the shafts. When an input is given via the control panel (e.g., the up arrow button (157), the square adjust-and-capture button (159) the down arrow button (161), etc.), via the rotatable bottom end (109), or via the adjustment knob (105), the conveyor belt system may drive the conveyor belt (403) in a first direction so as to increase a distance between an upper end of the uppermost shaft (115c) and the rotatable bottom end (109). In one or more embodiments, the conveyor belter system may drive the conveyor belt (403) in a second direction (opposite of the first direction) so as to decrease a distance between the upper end of the uppermost shaft (115c) and the rotatable bottom end (109).

As discussed above, in one or more embodiments, the uppermost shaft (115c) may be extended to its fullest extent before the shaft (115b) immediately below the uppermost shafted is extended; the shaft (115b) is extended to its fullest extent before the shaft (115a) immediately below the shaft (115b) is extended.

FIG. 4A shows a snapshot of when the uppermost shaft (115c) is being extended by the conveyor belt system. In one or more embodiments, the conveyor belt system may comprise a conveyor motor (401), a conveyor belt (403), conveyor belt holder (405). The conveyor motor (401) may be configured to drive the conveyor belt system upon receipt of instruction from the receiver (311) or input from the user. The conveyor belt system may be configured to change a distance between the ball uppermost shaft (115c) and the rotatable bottom end (109). In one or more embodiments, the conveyor belt holder may be attached to an upper end of the uppermost shaft (115c).

FIG. 4A shows a snapshot of when the uppermost shaft (115c) is just beginning to be extended by the conveyor belt system. Thus, the hidden portions (415a-415c) of the respective shafts (115a-115c) constitute a significant length of the respective shafts.

FIG. 4B shows a snapshot of when the uppermost shaft (115c) is fully extended. Thus, the hidden portion (415c) that corresponds the uppermost shaft (115c) constitutes a much smaller length in view of the total length of the uppermost shaft (115c). And because the second shaft (115b) is in the middle of an extension operation, its hidden portion (415b) is shorter in FIG. 4B than it is in FIG. 4A.

FIG. 4C shows a snapshot of when the uppermost shaft (115c) and the second shaft (115b) are fully extended. Thus, their respective hidden portions (415c, 415b) constitute a much smaller length in view of the total length of their respective shaft (115c, 115b). And because the first shaft (115a) is in the middle of an extension operation, its hidden portion (415a) is shorter in FIG. 4C than it is in FIG. 4A or FIG. 4B.

Figure 5A:
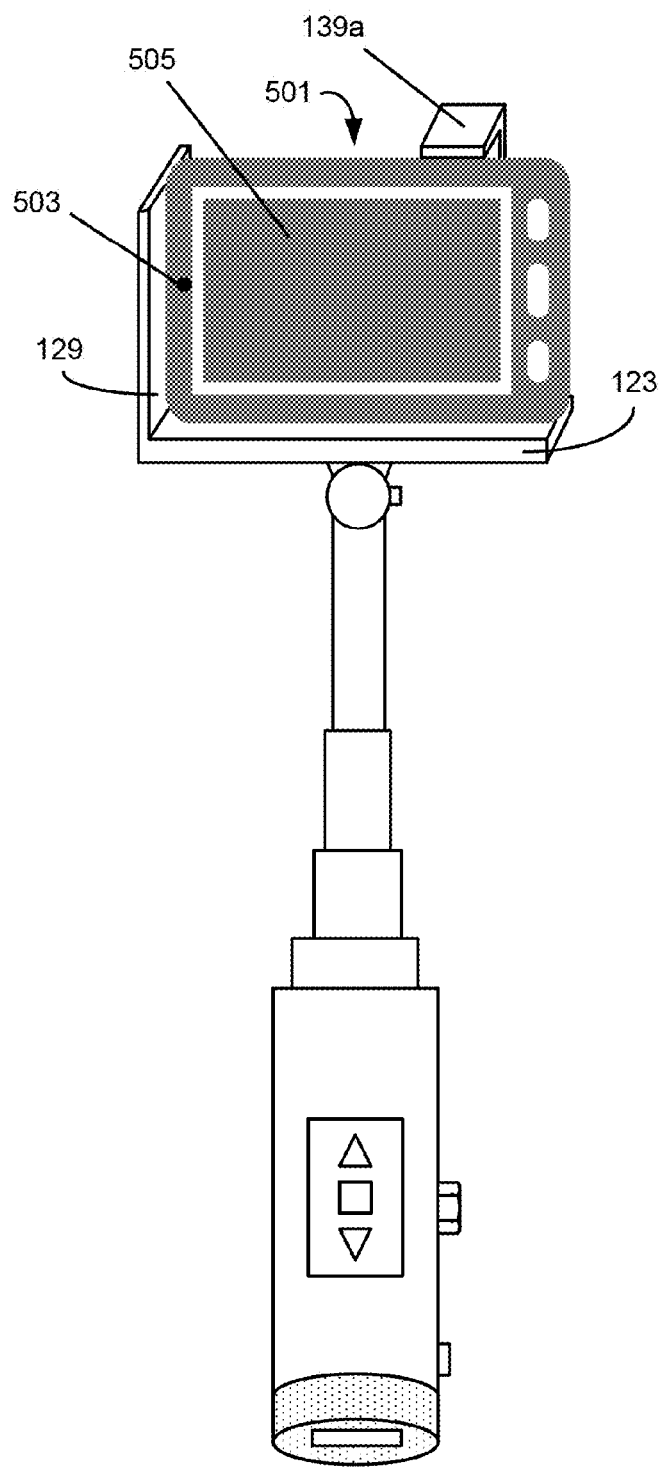
FIG. 5A shows a telescoping monopod apparatus according to one or more embodiments.

FIG. 5A shows a telescoping monopod apparatus having mirrors according to one or more embodiments. Specifically, FIG. 5A shows a photographic instrument (501) being held in the holder of the telescoping monopod apparatus according to one or more embodiments. In one or more embodiments, the photographic instrument (501) may comprise a camera (503) for capturing a target image, a display (505) for displaying a preview of the target image, and a plurality of control buttons (not labelled). While the photographic instrument (501) is shown to be restrained by the side wall (129) and the holding claw (139a), various modifications may be made. Examples of those various modifications have been described. However, the disclosure is not limited thereto. Specifically, one of ordinary skill in the art would appreciate that the disclosure may be modified in any shape or form so as to secure the photographic instrument (501) to the holder of the telescoping monopod apparatus. Further, although the disclosure is, in one aspect, generally directed to a telescoping monopod apparatus for holding a photographic instrument (501), the telescoping monopod apparatus need not hold the photographic instrument (501). That is, the photographic instrument (501) may be used to hold any portable or non-portable device. The telescoping monopod apparatus is not limited to hold an image-acquisition device.

In one or more embodiments, the photographic instrument (501) may be at least one selected from the group consisting of a smartphone, a laptop, a tablet, a phablet, a camera, a personal digital assistant (PDA), and any instrument that is capable of synchronizing with the telescoping monopod apparatus and capturing an image.

In one or more embodiments, the telescoping monopod apparatus may configured to hold an image-acquisition device. The image-acquisition device is not limited to outputting photographs. In one or more embodiments, the telescoping monopod apparatus may be directed to holding an image-acquisition device that outputs caricatures, cartoons, night vision images, heat maps, videos, etc., in any format that is available to those skilled in the art.

Figure 5B:
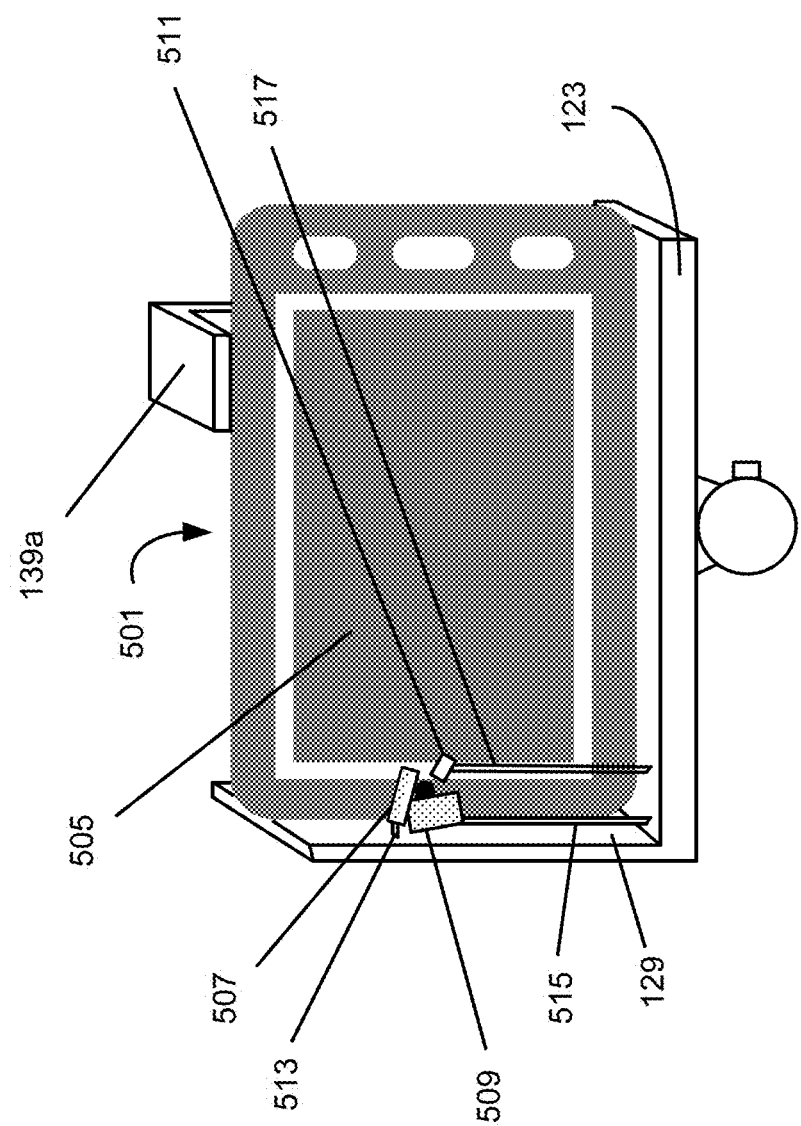
FIG. 5B shows a telescoping monopod apparatus having mirrors according to one or more embodiments.

FIG. 5B shows a telescoping monopod apparatus according to one or more embodiments. One or more embodiments of the disclosure are related to actuating the photographic instrument (501) itself to capture an image of the user using the photographic instrument (501). In one or more embodiments, as shown in FIG. 5B, three mirrors (507, 509, 511) may be used in congruence with the camera (503) of the photographic instrument (501). That is, by actuating the mirrors (507, 509, 511), the photographic instrument (501) may be able to capture a target image without actuating the position of the photographic instrument (501). Advantageously, the actuating of the mirrors (507, 509, 511) so that the photographic instrument (501) is able to adjust its view and capture a target image may be completed more precisely and consume less power and time than actuating the entire photographic instrument (501) by the telescoping monopod. This is due in part because the mirrors (507, 509, 511) are generally lighter in weight than that of the photographic instrument (501).

In one or more embodiments, the mirrors (507, 509, 511) may be deformable mirrors. Because deformable mirrors have many degrees of freedom, it may be that only one mirror is utilized to adjust the photographic instrument's (501) pan and tilt. For example, two shafts may be connected to one mirror—one shaft connected to the mirror at the mirror's circumference and one shaft connected to the mirror at the mirror's center. By pushing the shaft connected to the mirror's center inwardly or outwardly, the mirror may become convex or concave and change the view of the photographic instrument (501) accordingly. One of ordinary skill in the art would understand that the degrees of freedom of the mirror may be determined by the number of shafts/actuators attached to the mirror. Accordingly, the number of shafts and actuators used can vary from one embodiment to another.

Specific implementations of the deformable mirrors are not limited. In one or more embodiments, the deformable mirrors may comprise a plurality of mirror pieces. Each of which is able to move independently of another. In one or more embodiments, a plurality of actuators/shafts may be utilized to bend the mirror. In one or more embodiments, the deformable mirrors may work in conjunction with magnets. In one or more embodiments, the deformable mirrors may be coupled to a heat source that exerts heat to the mirrors to cause a bending. In one or more embodiments, the deformable mirrors may be liquid deformable mirrors held in a container and made with suspension of magnetic nanoparticles dispersed in the liquids.

In one or more embodiments, each of the mirrors (507, 509, 511) may be actuated by its own shaft (513, 515, 517). The shafts (513, 515, 517) may be connected to a motor of the actuator (303) located in the body (101). In one or more embodiments, the shaft (513) of the mirror (507) may be disposed on the side wall (129). In one or more embodiments, the shafts (515, 517) of the mirrors (509, 511) may be disposed on the base (123). In one or more embodiments, the mirror (507) may be used to pan the photographic instrument (501). In one or more embodiments, the mirror (507) may be used to tilt the photographic instrument (501). In one or more embodiments, the mirror (509) may be used to pan the photographic instrument (501). In one or more embodiments, the mirror (509) may be used to tilt the photographic instrument (501). In one or more embodiments, the mirror (511) may be used to pan the photographic instrument (501). In one or more embodiments, the mirror (511) may be used to tilt the photographic instrument (501). In one or more embodiments, the mirrors (507, 509, 511) may be used to in congruence with the ball (117) to achieve pan, tilt, and rotation. Further, one of ordinary skill in the art would appreciate that the mirror sizes of the mirrors (507, 509, 511) are not limited, so long as a target image is reflected from one mirror to another and ends up as an input to the camera (503) of the photographic instrument (501).

In one or more embodiments, an input (e.g., video stream) may be received by the photographic instrument (501) when in an image-acquisition mode. Specific details relating to face detection and recognition are described below in reference to FIGS. 6-9. When the photographic instrument (501) determines that the input needs to be actuated, it will wire or wirelessly communicate with the synchronized telescoping monopod apparatus. The telescoping monopod apparatus will thereby actuate the shafts (513, 515, 517) so that the mirrors are moved in accordance to an instruction from the photographic instrument (501).

Figure 5C:
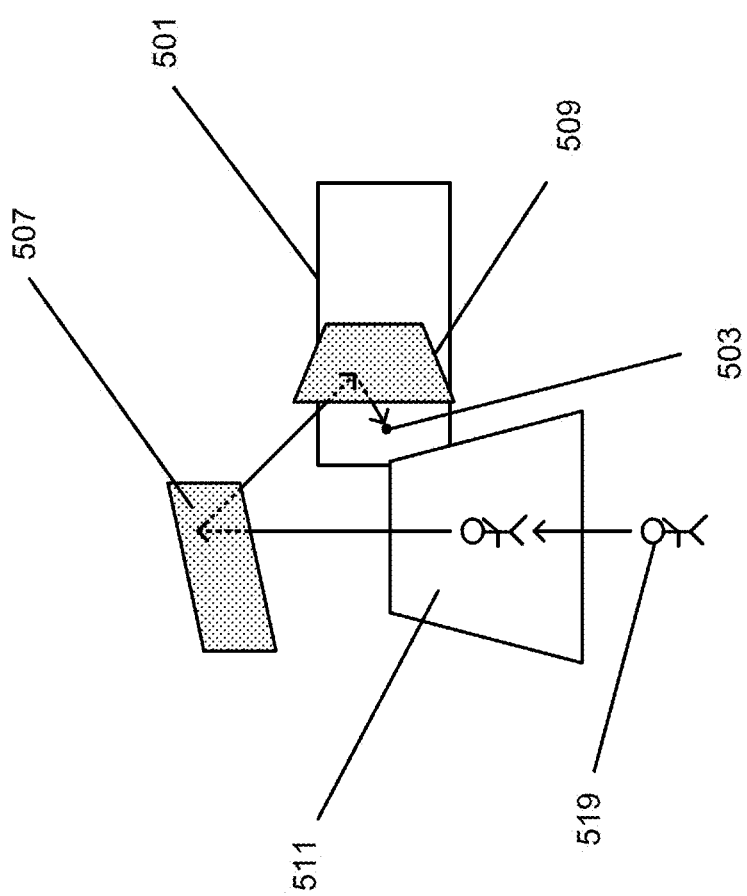
FIG. 5C shows a telescoping monopod apparatus having mirrors according to one or more embodiments.

FIG. 5C shows a telescoping monopod apparatus having mirrors according to one or more embodiments. In FIG. 5C, a user (519) uses the telescoping monopod apparatus having mirrors (507, 509, 511). Each of the mirrors (507, 509, 511) may be actuated by its own shaft or may share a shaft with another mirror. In one or more embodiments, a target image of the user (519) may be received by the mirror (511). The mirror (511) then reflects the target image to the mirror (507). The mirror (507) receives the target image of the user (519) and further reflects the target image to the mirror (509). Finally, the target image is reflected by the mirror (509) to the camera (503) of the photographic instrument (501). The target image is thereby captured as input and displayed on a display of the photographic instrument (501). As discussed above, the shaft of each mirror may be changed in length, height, or width to accompany differences in size, form, and/or shape of different photographic instruments. In one or more embodiments, the size of the mirror (511) may be the largest and the size of the mirror (509) may be the smallest. Certain configurations and adjustment of the mirrors' positions, angles, etc. with respect to another may be necessary to ensure properly reflection of the target image of the user (519) to the camera (503). Further, although the disclosure illustrates three mirrors, one of ordinary skill in the art would appreciate that one mirror at a minimum may carry out the function. Further, one of ordinary skill in the art would appreciate that more than three mirrors may be utilized. One of ordinary skill in the art would further appreciate that each of the mirrors may be positioned such that each mirror displays only that which is considered the target image nothing more, nothing less. In one or more embodiments, a predetermined threshold may exist for some errors in translating a target image from one mirror to the next (and ultimately into the camera (503)).

In one or more embodiments, the mirrors may be external from the photographic instrument (501). In one or more embodiments, the mirrors may be internal thereof (501). This may advantageously protect mirrors from breakage, dust, etc. In one or more embodiments, where the mirrors are housed as a part of the photographic instrument (501), a portion of the photographic instrument (501) may be transparent so as to enable the mirrors to reflect a wider range of the target image.

Turning to the flowcharts, while the various steps in the flowcharts are presented and described sequentially, one of ordinary skill will appreciate that some or all of the steps may be executed in different orders, may be combined or omitted, and some or all of the steps may be executed in parallel.

FIG. 6 shows a method for using a telescoping monopod apparatus in conjunction with a photographic instrument to capture an image according to one or more embodiments.

In Step 601, the photographic instrument (501) is synchronized with telescoping monopod apparatus. The synchronization may take place wired or wirelessly. In one or more embodiments, the wireless communication may be made possible by, for example, Bluetooth®.

In Step 603, the photographic instrument (501) is properly disposed at a designated area of the telescoping monopod. The designated area may be a holder. Various configurations of the holder has been described and will not be repeated for the sake of brevity.

In Step 605, a processor (301) of the telescoping monopod apparatus may be configured to determine whether the photographic instrument (501) is in an image-capturing mode. In one or more embodiments, if the processor (301) of the telescoping monopod apparatus determines that the photographic instrument (501) is not in an image-capturing mode, a vibrator of the control component may vibrate the body (101) to inform the user of the telescoping monopod that the telescoping monopod apparatus is not in an image-capturing mode. The same vibrator may vibrate the body (101) to inform the user, if the user interacts (i.e., presses) with the control panel (103) and the photographic instrument (501) is not synchronized with the telescoping monopod apparatus. In one or more embodiments, other signaling mechanisms may be used in place of the vibration to inform the user that the synchronizing of Step 601 failed or that the photographic instrument (501) is not in an image-capturing mode. In one or more embodiments, if the processor (301) of the telescoping monopod apparatus determines that the photographic instrument (501) is not in an image-capturing mode, the flowchart may end.

In one or more embodiments, if the processor (301) of the telescoping monopod apparatus determines that the photographic instrument (501) is in an image-capturing mode, the flowchart may proceed to Step 607.

In Step 607, the photographic instrument (501) is configured to capture an image of a target. Before capturing the image, the image-capturing mode displays, on a display of the photographic instrument, a preview image/video stream of the target. In one or more embodiments, the image-capturing mode of the photographic instrument (501), upon detecting that the square adjust-and-capture button (159) has been held depressed for a predetermined amount of time, is configured to determine whether there is a cutoff in the preview image. In one or more embodiments, if the square adjust-and-capture button (159) has been depressed for a predetermined amount of time and it is determined that there is no cutoff in the preview image, the flowchart may proceed to Step 611. In one or more embodiments, if the square adjust-and-capture button (159) has been depressed for a predetermined amount of time and it is determined that there is no cutoff in the preview image, a vibrator of the control component may vibrate the body (101) to inform the user to release the square adjust-and-capture button (159) so as to enable the flowchart to move to Step 611. The vibration of the body (101) to inform the user to release the square adjust-and-capture button (159) so as to proceed to Step 611 may be different in vibration frequency, length, and/or strength than the vibration of the body (101) to inform the user that the synchronizing of Step 601 has failed or that the photographic instrument (501) is not in an image-capturing mode. Differences in vibration advantageously enables the user to differentiate between when the telescoping monopod apparatus and the photographic instrument are in condition for taking a target image and when the telescoping monopod apparatus and the photographic instrument require synchronization, etc.

In one or more embodiments, if the square adjust-and-capture button (159) has been held depressed for a time less than the predetermined amount of time, the flowchart may simply proceed from Step 605 to Step 611 (skipping Step 607 and Step 609).

For example, assuming that the photographic instrument (501) is synchronized with the telescoping monopod apparatus, the photographic instrument is placed in a designated area of the telescoping monopod, the image photographic instrument is in an image-capturing mode, the user simply clicks on the square adjust-and-capture button (159) for less than a second, and the predetermined time is a second, the telescoping apparatus may transmit a command to the photographic instrument, thereby making the image-capturing mode capture an image of the target if no delay is set. If a delay is set, the clicking on the square adjust-and-capture button (159) for less than a predetermined amount of time enables the flowchart to proceed directly to Step 613 (and omit Step 607 and Step 609).

Returning to discussion of detecting a cutoff, the methodology of determining whether the cutoff exists can vary depending on the algorithm. And depending on the detection and the recognition (discussed in more details with regard to FIGS. 7 and 8), the telescoping monopod may be adjusted differently in Step 609. Various computer vision algorithms disclosed herein may be applied to the telescoping monopod apparatus. In one or more embodiments, various computer vision algorithms are computer readable instructions stored on a non-transitory computer readable medium. In one or more embodiments, the image-capturing mode determines whether a user's face has been cutoff in the target image/vide stream and readjusts the telescoping apparatus (e.g., pan, tilt, roll, zoom, etc.) so that the user's face is no longer cutoff in the target image/video stream.

In one or more embodiments, feature extraction may be used to extract humanoid features associated with the target. That is, if cutoff of a user is detected, the algorithm of the image-capturing mode may determine that at least the user is being cutoff. If a cutoff is determined, the flowchart may proceed to Step 609. If a cutoff is not detected, the flowchart may proceed to Step 611.

In Step 609, the actuator (303) may receive instruction from the processor (301) to produce a movement. Configurations of the actuator (303) and the specific interactions between the control component and the electronic component have been discussed and will be omitted for the sake of brevity. Upon adjusting a distance between an end of the uppermost shaft of the plurality of shafts and the rotatable bottom (109) and/or a position of the holder with respect to the body (101), the flowchart reverts to Step 607 for another determination to take place. In one or more embodiments, the adjusting may be adjusting the ball (117). In one or more embodiments, the adjusting may be adjusting the mirrors (507, 509) and their shafts (511, 513).

In one or more embodiments, the back-and-forth between Step 607 and Step 609 may continue until one of the following occurs: (i) the cutoff is no longer present, (ii) a manual override instruction, in the form of, for example, adjustment knob (105) rotation or rotatable bottom end (109) rotation, is received, by the telescoping monopod apparatus, (iii) a maximum distance between the end of the uppermost shaft of the plurality of shafts and the rotatable bottom end (109) is reached, (iv) the square adjust-and-capture button (159) has been depressed for longer than a predetermined time, or (v) the user is no longer depressing the square adjust-and-capture button (159).

In one or more embodiments, the back-and-forth between Step 607 and Step 609 may continue until whichever of (i)-(v) occurs first. In one or more embodiments, the back-and-forth between Step 607 and Step 609 may continue until whichever two of (i)-(v) occur. Other combinations may be possible to end the "loop."

In Step 611, the processor (301) of the telescoping monopod apparatus determines whether a timer (149) has been utilized to set a delay capture mode. As discussed above, and will be omitted for the sake of brevity, the timer (149) may set a predetermined delay to delay the capturing in Step 615 by positioning the toggle (151) in one of the plurality of gaps. If a delay is determined by the processor (301) to be not set, the flowchart may proceed to Step 615. If a delay is determined by the processor (301) to be set, the flowchart may proceed to Step 613.

In Step 613, a delay in time, corresponding to the time set by the timer (149) occurs before the flowchart proceeds to Step 615.

In Step 615, the target image is captured by the photographic instrument (501), and the flowchart ends.

FIG. 7 shows a method for face detection and recognition and for adjusting a telescoping monopod apparatus in Euclidean space according to the face detection and recognition according to one or more embodiments.

In Step 701, the photographic instrument (501) is in an image-capturing mode. In Step 701, the photographic instrument (501) may receive an input. In one or more embodiments, the photographic instrument (501) may receive a streaming video input in real-time.

In Step 703, the photographic instrument (501) may determine whether the input comprises a face. If the input comprises a face, the flowchart may proceed to Step 611. If the input does not comprise a face, the flowchart may proceed to Step 705.

In Step 705, the photographic instrument (501) may determine whether the input comprises a partial face. If the input comprises a partial face, the flowchart may proceed to Step 707. If the input does not comprise a partial face the flowchart may proceed to Step 711.

In Step 707, a position of the partial face relative to the photographic instrument may be determined by the photographic instrument (501).

In Step 709, the photographic instrument (501) may zoom out or may cause the photographic instrument to increase a distance between the user and the photographic instrument (501) based on the determined position. In one or more embodiments, upon detecting, by the photographic instrument (501), a tilted face, the photographic instrument (501) may cause the telescoping monopod apparatus to pan, tilt, or rotate to arrive at a target image. In one or more embodiments, the adjusting may be adjusting the ball (117). In one or more embodiments, the adjusting may be adjusting the mirrors (507, 509, 511) and their shafts (513, 515, 517).

In one or more embodiments, the flowchart may proceed from Step 709 to Step 611. In one or more embodiments, the flowchart may proceed from Step 709 to Step 703.

In Step 711, the photographic instrument (501) may be panned, tilted, and/or rotated in a predetermined pathway until a predetermined condition is met. The predetermined condition may include at least one of, but is not limited to, (i) detecting a partial face, (ii) detecting a face, (iii) receiving a manual input, (iv) detecting that a square adjust-and-capture button (159) is no longer depressed, and (v) detecting that the square adjust-and-capture (159) has been depressed for longer than a predetermined time. In one or more embodiments, the adjusting may be adjusting the ball (117). In one or more embodiments, the adjusting may be adjusting the mirrors (507, 509) and their shafts (511, 513).

If (i), the flowchart may proceed to Step 707 or Step 805; if (ii), the flowchart may proceed to Step 611; if (iii), the flowchart may proceed to Step 611 or end; if (iv), the flowchart may end; and if (v), the flowchart may end.

In one or more embodiments, voice activation may be utilized to call attention to the photographic instrument (501). Upon receiving a voice input, the photographic instrument (501) may send signal to the telescoping monopod apparatus to temporarily depart from the predetermined pathway and search for the location of the user having the voice. If the photographic instrument (501) is unable to locate the partial face or the face of the user providing the voice input, the telescoping monopod apparatus may return to subjecting the photographic instrument (501) to finishing the predetermined pathway. Keywords may be stored in the photographic instrument (501) to prevent inadvertent voice activations. That is, the voice activation may be active only when certain words are pronounced and detected by the photographic instrument (501).

In one or more embodiments, voice activation may be utilized to enable the photographic instrument (501) to search for a partial face or a face. In one or more embodiments, voice activation may be utilized to enable the photographic instrument (501) to search for a partial face or a face without requiring the user to physically interact with the control panel and/or any other component on the telescoping monopod. In one or more embodiments, voice activation may be utilized to enable the photographic instrument (501) to capture an image. In one or more embodiments, voice activation may be utilized to enable the photographic instrument (501) to capture an image when certain words are pronounced and detected by the photographic instrument (501).

FIG. 8 shows a method for face detection and recognition and for adjusting a telescoping monopod apparatus in Euclidean space according to the face detection and recognition according to one or more embodiments. FIG. 8 shows a substantially similar method as that shown in FIG. 7.

Different from FIG. 7, the photographic instrument (501) of FIG. 8 first determines whether there is a partial face in Step 803 and, if not, determine whether there is a full face in Step 809.

Step 801 may be the same as Step 701.

As discussed, in Step 803, the photographic instrument (501) determines whether the input comprises a partial face. If the photographic instrument (501) determines that the input comprises a partial face, the flowchart may proceed to Step 805. If the photographic instrument (501) determines that the input does not comprise a partial face, the flowchart may proceed to Step 809.

Step 805 may be the same as Step 707.

Step 807 may be the same as Step 709.

In Step 809, the photographic instrument (501) determines whether the input comprises a face. If the photographic instrument (501) determines that the input comprises a face, the flowchart may proceed to Step 611. If the photographic instrument determines that the flowchart does not comprise a face, the flowchart may proceed to Step 811.

In Step 811, the photographic instrument may be panned, tilted, and/or rotated in a predetermined pathway until a predetermined condition is met. The predetermined condition may include at least one of, but is not limited to, (i) detecting a partial face, (ii) detecting a face, (iii) receiving a manual input, (iv) detecting that a square adjust-and-capture button (159) is no longer depressed, and (v) detecting that the square adjust-and-capture (159) has been depressed for longer than a predetermined time. In one or more embodiments, the adjusting may be adjusting the ball (117). In one or more embodiments, the adjusting may be adjusting the mirrors (507, 509) and their shafts (511, 513).

If (i), the flowchart may proceed to Step 805; if (ii), the flowchart may proceed to Step 611; if (iii), the flowchart may proceed to Step 611 or end; if (iv), the flowchart may end; and if (v), the flowchart may end.

FIG. 9 shows a method for focusing a photographic instrument according to one or more embodiments. FIG. 9 also shows an antitheft method for a telescoping monopod according to one or more embodiments.

Step 901 may be the same as Step 701.

In Step 903, the photographic instrument (501) detects a face in the input.

In Step 905, the photographic instrument (501) and/or a telescoping monopod apparatus synchronized with the photographic instrument (501) may determine whether the face exists in a database. The database may be stored in a server separate from the photographic instrument (501) and/or the telescoping monopod apparatus. The database may be stored in the memory (313) of the telescoping monopod apparatus. The database may be stored in a memory of the photographic instrument (501). If the face does not exist in the database, the flowchart may proceed to Step 909. If the face does exist in the database, the flowchart may proceed to Step 907.

In Step 907, the photographic instrument (501) may focus on the face.

In Step 909, a notification (e.g., email, text, etc.) may be sent to a registered user. The registered user may be a user who has registered the telescoping monopod apparatus when he purchased the telescoping monopod apparatus. The notification may comprise the face, a GPS location of the telescoping monopod and/or the photographic instrument (501), etc. The notification may or may not be disabled using the telescoping monopod apparatus. In one or more embodiments, the notification may request input from the registered user. The input may be "yes" or "no" to the question "Do you know this user?"

In one or more embodiments, if the registered user inputs "yes," the face may be added to the database. In one or more embodiments, if the registered user inputs "no," the telescoping monopod apparatus may be deactivated. That is, the telescoping monopod apparatus may enter a hibernation mode that can only be reactivated by the registered user and/or an authorized retailer of the telescoping monopod apparatus and/or the photographic instrument (501).

In Step 911, the face is added to the database.

In one or more embodiments, the database may be used to provide feedback to the photographic instrument (501) and/or the telescoping monopod apparatus. For example, if, in an image, there exists a plurality of people, the photographic instrument (501), using the database, may focus on the individual who has an entry in the database.

In one or more embodiments, the database may be provided to label individuals in an image when the image is taken by and stored in the photographic instrument (501).

In one or more embodiments, the labelled image may be automatically uploaded to a pre-synchronized social-networking platform. In one or more embodiments, the uploaded images having faces registered as entries in the database may be pre-labelled. The uploaded images may further cause a tagging of, messaging to, and/or notifying the user, having the registered face in the database, on the social-networking platform.

Face Detection and Recognition

Various face detection and face recognition algorithms may be implemented in congruence with the photographic instrument (501) and/or the telescoping monopod apparatus.

In one or more embodiments, Cascaded Classifiers may be used to detect a face in an input. As discussed, the input may be a streaming video input from the photographic instrument (501).

In one or more embodiments, at least one of "Tom-vs-Pete" classifiers, high-dimensional local binary patterns, Fisher kernel, Bayesian face recognition, Associate-Predict model, Joint Bayesian algorithm, Face++, GaussianFace, and a combination thereof, may be used to recognize the face in the input.

In one or more embodiments, the user may predetermine where, on the image, the user's head is to be. And in the future, when the user uses the telescoping monopod apparatus along with the photographic instrument, the telescoping monopod apparatus will always position the photographic instrument such that the user is at the predetermined location of the image.

In one or more embodiments, once the photographic instrument locates a face of the user, the photographic instrument will continue to follow the face of the user until, for example, the user captures an image.

While the disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While the disclosure has been described with respect to a limited number of embodiments, those skilled in the art, having benefit of this disclosure, will appreciate that other embodiments can be devised which do not depart from the scope of the disclosure as disclosed herein.

Furthermore, one of ordinary skill in the art would appreciate that certain "components," "units," "parts," "elements," or "portions" of one or more embodiments of the present disclosure may be implemented by a circuit, processor, etc., using any known methods. Accordingly, the scope of the disclosure should be limited only by the attached claims.

What is claimed is:

1. A telescoping monopod apparatus configured to hold a photographic instrument comprising:
   a body housing a control component and an electronic component, the body having a first end and a second end;

a plurality of shafts disposed in an interior of the body from the second end of the body, the second end being opposite of the first end;

a connector disposed on an uppermost shaft of the plurality of shafts and configured to contact a holder;

a first support protruding from the holder and holding a first mirror; and a second support protruding from the holder and holding a second mirror, wherein the electronic component and the control component are configured to cause movement of the plurality of shafts, and wherein the electronic component and the control component are configured to actuate at least one of the first mirror and the second mirror upon the photographic instrument detecting a feature of interest, upon receiving an instruction from the photographic instrument, or upon receiving an instruction from the telescoping monopod apparatus.

2. The apparatus according to claim 1, wherein:
the holder comprises a base, a side wall, and a holding claw,
the holding claw has a moveable portion operatively connected to a spring, and
each of the base and the side wall comprises a pad having a groove.

3. The apparatus according to claim 1, wherein:
the connector comprises a ball and a spheroidal joint,
the spheroidal joint is a hole on a bottom face of the base, and
the ball is configured to pan, tilt, and rotate the holder.

4. The apparatus according to claim 3, wherein the ball comprises a position fixing knob configured to secure a position of the holder relative to the body.

5. The apparatus according to claim 1, wherein the body comprises a power switch, a control panel operatively connected to the control component and to the electronic component, and an adjustment knob.

6. The apparatus according to claim 5, wherein:
the control panel comprises a plurality of icons configured to change a distance between the holder and the first end, and
the adjustment knob is configured to change a distance between the holder and the first end.

7. The apparatus according to claim 1, wherein:
the first end is a rotatable end, and
the rotatable end comprises a crevasse configured to receive an insert of an electronic device.

8. The apparatus according to claim 7, wherein the rotatable end, when turned in a clockwise direction relative to a center axis of the body, increases a distance between the holder and the rotatable end.

9. The apparatus according to claim 1, wherein:
the holder comprises a base having an upper face and a bottom face, a first side wall, a second side wall,
a pad having a groove is disposed in the upper face, and
the first side wall and the second side wall are each operatively connected to a spring and are configured to move in a direction parallel to a length of the holder.

10. The apparatus according to claim 1, wherein the body comprises a plurality of gaps and a timer having a toggle configured to interlock with one of the plurality of gaps, each of the plurality of gaps sets a predetermined delay time to the photographic instrument placed in the holder.

11. The apparatus according to claim 1, wherein the plurality of shafts are disposed concentric to one another and concentric to the body.

12. The apparatus according to claim 1, wherein:
the control component comprises a conveyor belt system having a conveyor motor driving the conveyor belt system, a conveyor belt operatively connected to the conveyor motor, and a conveyor belt holder,
the conveyor belt system is configured to change a distance between the holder and the first end, and
the conveyor belt holder is attached to an upper end of the uppermost shaft of the plurality of shafts.

13. The apparatus according to claim 1, wherein:
the control component comprises a gear system having a plurality of gears attached to the plurality of shafts and a motor driving the gear system, and
the plurality of gears engages one another and is configured to change a distance between the holder and the first end.

14. The apparatus according to claim 1, wherein a distance between a center of the first mirror and a center of a lens of the photographic instrument is predetermined.

15. The apparatus according to claim 1, wherein a distance between a center of a first mirror and a center of the second mirror is predetermined.

16. A telescoping monopod apparatus configured to hold a photographic instrument comprising:
a body housing a control component and an electronic component configured to actuate the telescoping monopod apparatus;
a plurality of shafts disposed in an interior of the body from an upper end of the body;
a ball disposed on an uppermost shaft of the plurality of shafts;
a spheroidal joint configured to receive the ball on a first end, the spheroidal joint is attached to a holder on a second end;
a first support protruding from the holder and holding a first mirror; and
a second support protruding from the holder and holding a second mirror,
wherein the electronic component and the control component are configured to actuate at least one of the first mirror and the second mirror upon detecting a feature of interest or upon receiving an instruction from the photographic instrument, and
wherein the electronic component and the control component are configured to cause movement of the plurality of shafts and movement of the ball.

17. The apparatus according to claim 16, wherein a distance between the first support and the second support is predetermined.

* * * * *